(No Model.)

J. T. HASTINGS.
FISH HOOK.

No. 564,517. Patented July 21, 1896.

Witnesses:
J. Halpenny
S. E. Sharon

Inventor:
James Hastings
By his attorneys
Cridley Hopkins

UNITED STATES PATENT OFFICE.

JAMES T. HASTINGS, OF CHICAGO, ILLINOIS, ASSIGNOR OF ONE-HALF TO CHARLES A. CRANE OF SAME PLACE.

FISH-HOOK.

SPECIFICATION forming part of Letters Patent No. 564,517, dated July 21, 1896.

Application filed October 17, 1895. Serial No. 565,972. (No model.)

*To all whom it may concern:*

Be it known that I, JAMES T. HASTINGS, a citizen of the United States, residing at Chicago, in the county of Cook and State of Illinois, have invented certain new and useful Improvements in Fish-Hooks, of which the following is a specification.

The object of the present invention is to provide fish-hooks with means whereby the bait may be attached to them more securely than is possible with any hook with which I am familiar.

The invention consists in the features of novelty that are particularly pointed out in the claims hereinafter, and in order that it may be fully understood I will describe it with reference to the accompanying drawings, which are made a part of this specification, and in which—

Figure 1:
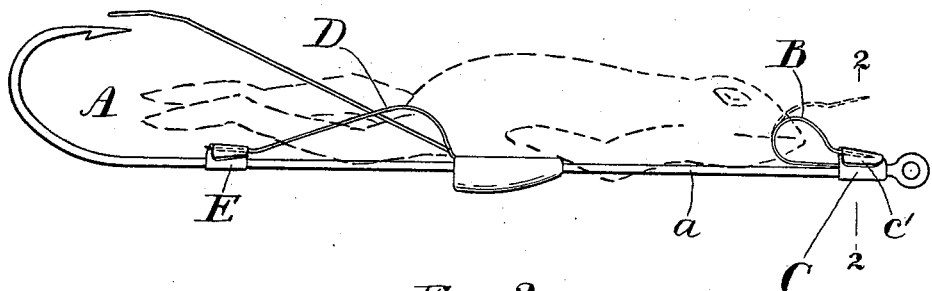
Figure 2:
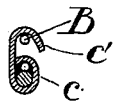
Figure 3:
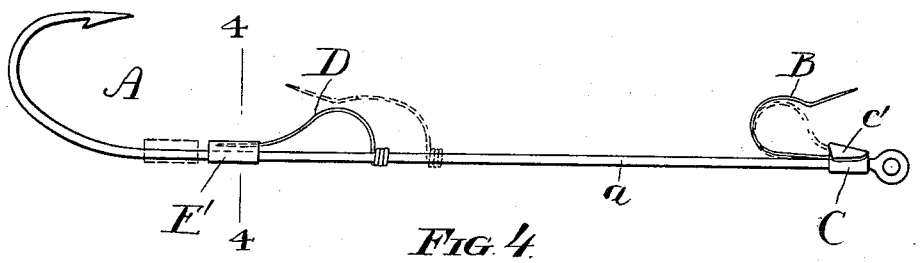
Figure 4:
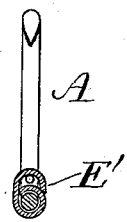

Figure 1 is a side elevation of a fish-hook embodying some features of the invention. Fig. 2 is a transverse section thereof on the line 2 2, Fig. 1. Fig. 3 is a side elevation of a fish-hook differing slightly from the one shown in Fig. 1 and embodying the invention in its preferred form. Fig. 4 is a transverse section thereof on the line 4 4, Fig. 3.

A represents the fish-hook, to the stem $a$ of which is attached a hook B for the purpose of securing the bait, one species of which is indicated by the dotted line in Fig. 1. This bait-hook is preferably located near the forward end of the stem $a$, so that when drawn through the water the bait will be in advance of the point of the fish-hook, and the said bait-hook preferably consists of a piece of spring-wire bent to proper shape and secured at one of its ends to the stem $a$, its other end being sharpened so as to make it easy to thrust it through the bait. It is without a barb and is adapted to be confined by a guard C, which is attached to the stem $a$. This guard consists, preferably, of a piece of sheet metal having a portion $c$, wrapped around the stem of both the fish-hook and the bait-hook, (the whole being soldered together,) and a portion $c'$, which is bent to form a lip for engaging the free end of the bait-hook, as shown by full lines in Figs. 1 and 2 and as indicated by dotted lines in Fig. 3. Confining the point of the bait-hook in this way prevents it from gathering weeds and at the same time makes it impossible for the bait to become unhooked.

When the fish-hook and the bait used are both small, a single bait-hook constructed as above described is sufficient, but, where the stem of the fish-hook is long and the bait large, in addition to the bait-hook B, I prefer to use a keeper D for assisting in securing the bait. This keeper is located in rear of the bait-hook and consists of a piece of wire having one of its ends secured to the stem $a$ and its other end sharpened, so as to make it easy to thrust it through the bait, after which it may be confined by a guard on the stem $a$. As shown in Fig. 1, the keeper is permanently fixed to the stem $a$, but as shown in Fig. 3 it is fixed thereto so as to be capable of sliding thereon for the purpose of enabling it to be so placed as to accommodate bait of different sizes. The guard for confining the free end of the keeper is in like manner either immovable or movable upon the stem $a$, accordingly as the keeper is immovable or movable, and hence in Fig. 1 is shown a fixed guard E, having characteristics of the guard C, while in Fig. 3 is shown a movable guard E'. With a fish-hook thus equipped the bait may be placed exactly where it belongs with relation to the point of the fish-hook and there secured so firmly that it cannot possibly be unhooked, and a fish cannot take it without being caught.

Having thus described my invention, the following is what I claim as new therein and desire to secure by Letters Patent:

1. The combination with a fish-hook, of means for securing bait thereto, said means consisting of a piece of wire having one of its ends secured to the stem of the hook and its other end left free to be thrust through the bait, and a guard carried by the stem of the hook and adapted to engage and confine the free end of said wire, substantially as set forth.

2. The combination with a fish-hook of a bait-hook made of a piece of flexible wire having one of its ends secured to the stem of the hook, and a guard for confining the free end of the bait-hook, said guard consisting of a piece of sheet metal having a portion wrapped around the stem of the fish-hook and bait-hook, and a portion bent to form a lip, substantially as set forth.

3. The combination of a fish-hook and a bait-hook secured to its stem in advance of the point, of a keeper secured to the stem of the fish-hook in rear of the bait-hook, said keeper consisting of a piece of wire having one of its ends secured to the stem of the fish-hook and its other end left free to be thrust through the bait, and means for confining the free end of said keeper, substantially as set forth.

4. The combination with a fish-hook and a bait-hook secured to its stem in advance of the point, of a keeper secured to the stem of the fish-hook in rear of the bait-hook, said keeper consisting of a piece of wire having one of its ends secured to the stem of the fish-hook and its other end left free and a guard secured to the stem of the fish-hook and adapted to engage the free end of the keeper, said keeper and its guard being relatively adjustable on the stem of the fish-hook substantially as set forth.

JAMES T. HASTINGS.

Witnesses:
L. M. HOPKINS,
S. E. SHARON.